(12) United States Patent
Hamanaka

(10) Patent No.: US 9,270,175 B2
(45) Date of Patent: Feb. 23, 2016

(54) DRIVING DEVICE, LIGHT-EMITTING DEVICE, PROJECTION DEVICE AND CONTROL METHOD

(71) Applicant: CASIO COMPUTER CO., LTD., Tokyo (JP)

(72) Inventor: Hideo Hamanaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 36 days.

(21) Appl. No.: 14/472,231

(22) Filed: Aug. 28, 2014

(65) Prior Publication Data

US 2015/0061527 A1  Mar. 5, 2015

(30) Foreign Application Priority Data

Aug. 30, 2013 (JP) .................................. 2013-178916

(51) Int. Cl.
| | |
|---|---|
| *H02M 3/158* | (2006.01) |
| *H05B 33/08* | (2006.01) |
| *H02M 1/32* | (2007.01) |

(52) U.S. Cl.
CPC ................ *H02M 3/158* (2013.01); *H02M 1/32* (2013.01); *H05B 33/0809* (2013.01); *H05B 33/0815* (2013.01)

(58) Field of Classification Search
USPC ....... 315/247, 185 S, 224, 225, 291, 307–326
See application file for complete search history.

(56) References Cited

U.S. PATENT DOCUMENTS

| | | | |
|---|---|---|---|
| 2007/0229450 A1 | 10/2007 | Suzuki | |
| 2010/0148580 A1 | 6/2010 | Taniuchi | |
| 2012/0262073 A1* | 10/2012 | Sumisaki | ........... G03B 15/0447 315/159 |
| 2015/0061544 A1* | 3/2015 | Hamanaka | ............ H02M 3/156 315/307 |

FOREIGN PATENT DOCUMENTS

| | | |
|---|---|---|
| JP | 2007-273691 A | 10/2007 |
| JP | 2008-234842 A | 10/2008 |
| JP | 2010-166797 A | 7/2010 |

* cited by examiner

*Primary Examiner* — Tuyet Vo
(74) *Attorney, Agent, or Firm* — Chen Yoshimura LLP

(57) ABSTRACT

A driving device is provided with: a power circuit in which it is possible to modify an output current value of an output terminal configured to have a load connected thereto; an output capacitor connected between the output terminal of the power circuit and a reference potential node; a switching element connected between the output terminal of the power circuit and the reference potential node; and a control unit that controls the output current value of the power circuit.
The control unit turns the switching element ON and OFF and controls the output current value of the power circuit during a period in which the switching element is ON such that the voltage of the output terminal of the power circuit during this period is equal to or lower than the voltage applied to the load during a period when this load is OFF.

19 Claims, 5 Drawing Sheets

DRIVING DEVICE, LIGHT-EMITTING DEVICE, PROJECTION DEVICE AND CONTROL METHOD

BACKGROUND OF THE INVENTION

1. Field of the Invention

The present invention relates to a driving device, a light-emitting device, a projection device and a control method.

2. Description of Related Art

Japanese Patent Application Laid-Open Publication No. 2008-234842 discloses a time-sharing (field-sequential) projection device.

The time-sharing projection device projects colored images by successively illuminating a display element with red light, green light, and blue light.

In particular, Japanese Patent Application Laid-Open Publication No. 2008-234842 discloses a projection device that successively lights a red light emitting diode, green light emitting diode, and blue light emitting diode with a single DC/DC converter.

The voltage is different when the red light emitting diode, green light emitting diode, or blue light emitting diode is lit, and these successively emit light by using a single DC/DC converter; therefore, the output voltage of the DC/DC converter fluctuates (see FIG. 6 in Japanese Patent Application Laid-Open Publication No. 2008-0243842). The DC/DC converter output voltage is lowest when the red light emitting diode is active, highest when the green light emitting diode is active, and second highest when the blue light emitting diode is active.

SUMMARY OF THE INVENTION

However, in the technology disclosed in Japanese Patent Application Laid-Open Publication No. 2008-234842, the output voltage of the DC/DC converter falls when illumination of the blue light emitting diode or red light emitting diode has started.

Due to this, inrush currents due to differences in voltage will flow to the blue light emitting diode or the red light emitting diode.

The present invention aims at preventing inrush currents from flowing to loads such as the light-emitting diodes when the output current or the output voltage of a power circuit such as a DC/DC converter changes.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages an in accordance with the purpose of the present invention, as embodied and broadly described, in one aspect, the present invention provides a driving device, including: a power circuit that can modify an output current or an output voltage of an output terminal configured to have a load connected thereto; an output capacitor connected between the output terminal of the power circuit and a reference potential node; a switching device connected between the output terminal of the power circuit and the reference potential node; and a control unit that controls the output current or the output voltage of the power circuit, wherein the control unit turns the switching device ON and OFF, and wherein the control unit controls the output current or the output voltage of the power circuit while the switching device is ON such that a voltage of the output terminal of the power circuit while the switching device is ON becomes less than or equal to a voltage applied to the load while the switching device is OFF thereafter.

In another aspect, the present invention provides a method of controlling a driving device having a power circuit that can modify an output current or an output voltage of an output terminal configured to have a load connected thereto, an output capacitor connected between the output terminal of the power circuit and a reference potential node, a switching device connected between the output terminal of the power circuit and the reference potential node, and a control unit that controls the output current or the output voltage of the power circuit, the method including: controlling the switching device to be ON and OFF and controlling the output current or the output voltage of the power circuit while the switching device is ON such that a voltage of the output terminal of the power circuit while the switching device is ON becomes less than or equal to a voltage applied to the load while the switching device is OFF thereafter.

In another aspect, the present invention provides a power circuit that can modify an output current or an output voltage of an output terminal configured to have a load connected thereto; an output capacitor connected between the output terminal of the power circuit and a reference potential node; a switching device connected between the output terminal of the power circuit and the reference potential node; and a control unit that controls the output current or the output voltage of the power circuit, wherein the control unit sets the output current or the output voltage of the power circuit to a high level, a low level that is lower than this high level, and a middle level that is higher than the low level but lower than the high level, in this order in cycle repeatedly, wherein the control unit turns the switching device OFF when the output current or the output voltage of the power circuit is set to the high level and the middle level, and wherein the control unit turns the switching device ON when the output current or the output voltage of the power circuit is set at the low level.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Embodiments of the present invention will be described below with reference to the drawings. However, the embodiments described below have various limitations that are technically preferable for realizing the present invention. Therefore, the technical scope of the present invention is not limited to the examples of embodiments and drawings described below.

Embodiment 1

Figure 1:
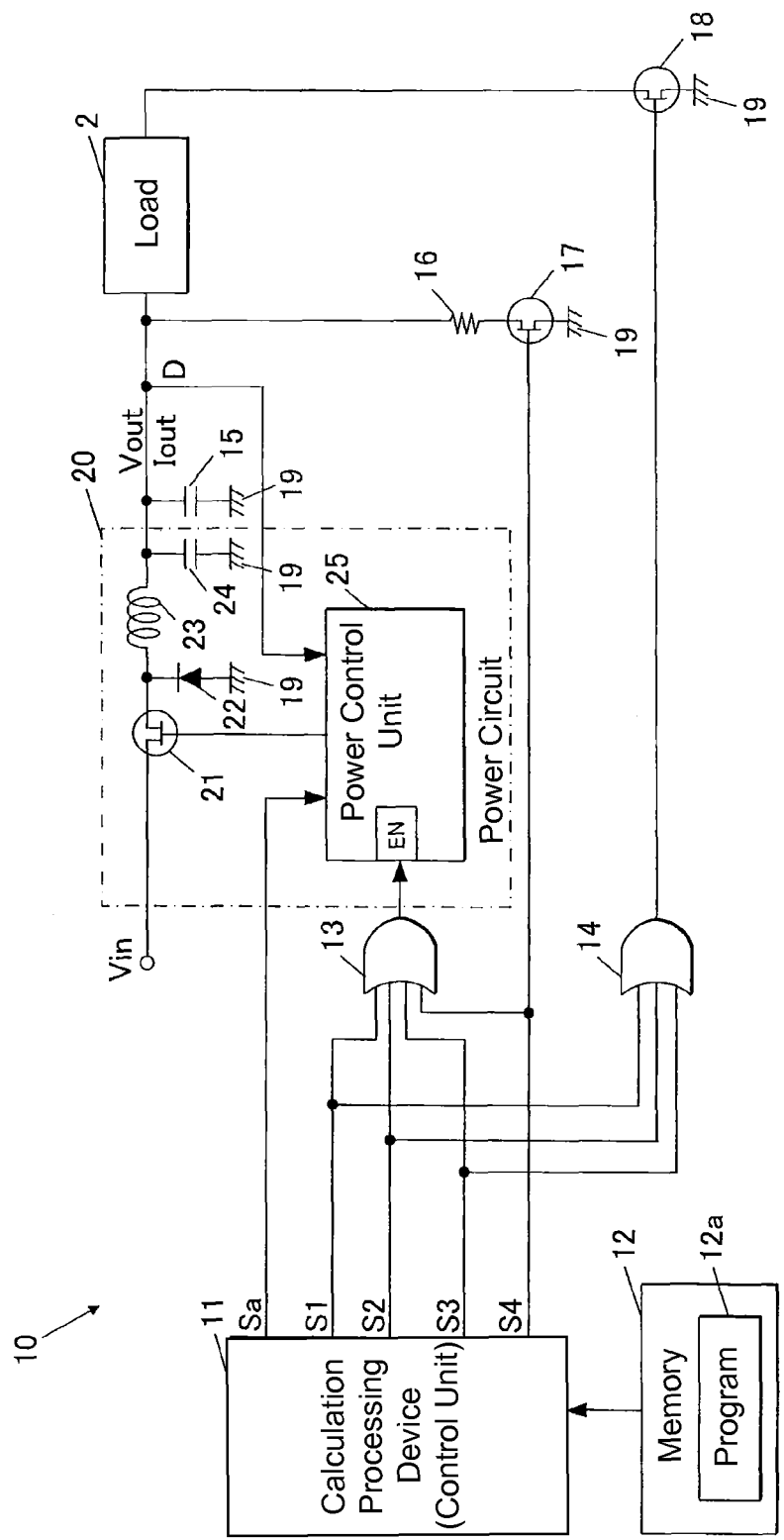
FIG. 1 is a circuit diagram of a driving device according to Embodiment 1 of the present invention.

FIG. 1 is a block diagram of a driving device 10 of a load 2.

This driving device 10 drives the load 2. The load 2 is a light source (a semiconductor light-emitting device (a light-emitting diode, laser diode, organic light-emitting diode, organic EL device, or the like, for example), an incandescent lamp, discharge lamp, or the like), resistor, heater, motor, or the like.

If the load 2 is a light source, the device having the driving device 10 and the load 2 is a light-emitting device. In this case, this light-emitting device is applied to a projection device, and the load 2, which is a light source, can be used as the light source of the projection device.

The projection device further has a spatial light modulator (a liquid crystal shutter array panel or a digital micro-mirror device), and the light emitted by the load 2 that is a light source illuminates the spatial light modulator by a variety of optical devices, and projects the light that has been modulated by the respective pixels of the spatial light modulator onto a screen through a projection optical system.

This driving device 10 includes calculation processing unit (control unit) 11, a memory 12, OR gates 13 and 14, an output capacitor 15, a resistor 16, switching elements 17 and 18, a power circuit 20, and the like.

The calculation processing unit 11 is a processor such as a microcomputer or a DSP (digital signal processor). The memory 12 is a non-volatile semiconductor memory. The memory 12 may be embedded in the calculation processing unit 11, or may be disposed outside the calculation processing unit 11. The memory 12 can be read by the calculation processing unit 11. Programs 12a executable by the calculation processing unit 11 are stored in the memory 12. The programs 12a are executed by the calculation processing unit 11, thereby outputting signals Sa, S1, S2, S3, and S4 by the calculation processing unit 11.

The power circuit 20 is activated by the calculation processing unit 11 outputting the signals S1, S2, S3, and S4 to the power circuit 20 via the OR gate 13.

Variable control is performed on the output current or output voltage of the power circuit 20 by the calculation processing unit 11 outputting the signal Sa to the power circuit 20 such that a voltage value Vout or a current value Iout corresponds to the level of the signal Sa.

The calculation processing unit 11 turns the switching element 17 ON or OFF by the signal S4 being outputted to this switching element 17. The calculation processing unit 11 turns the switching element 18 to ON or OFF in the opposite phase to the switching element 17 by the signals S1, S2, and S3 being inputted to the switching element 18 via the OR gate 14.

Figure 2:
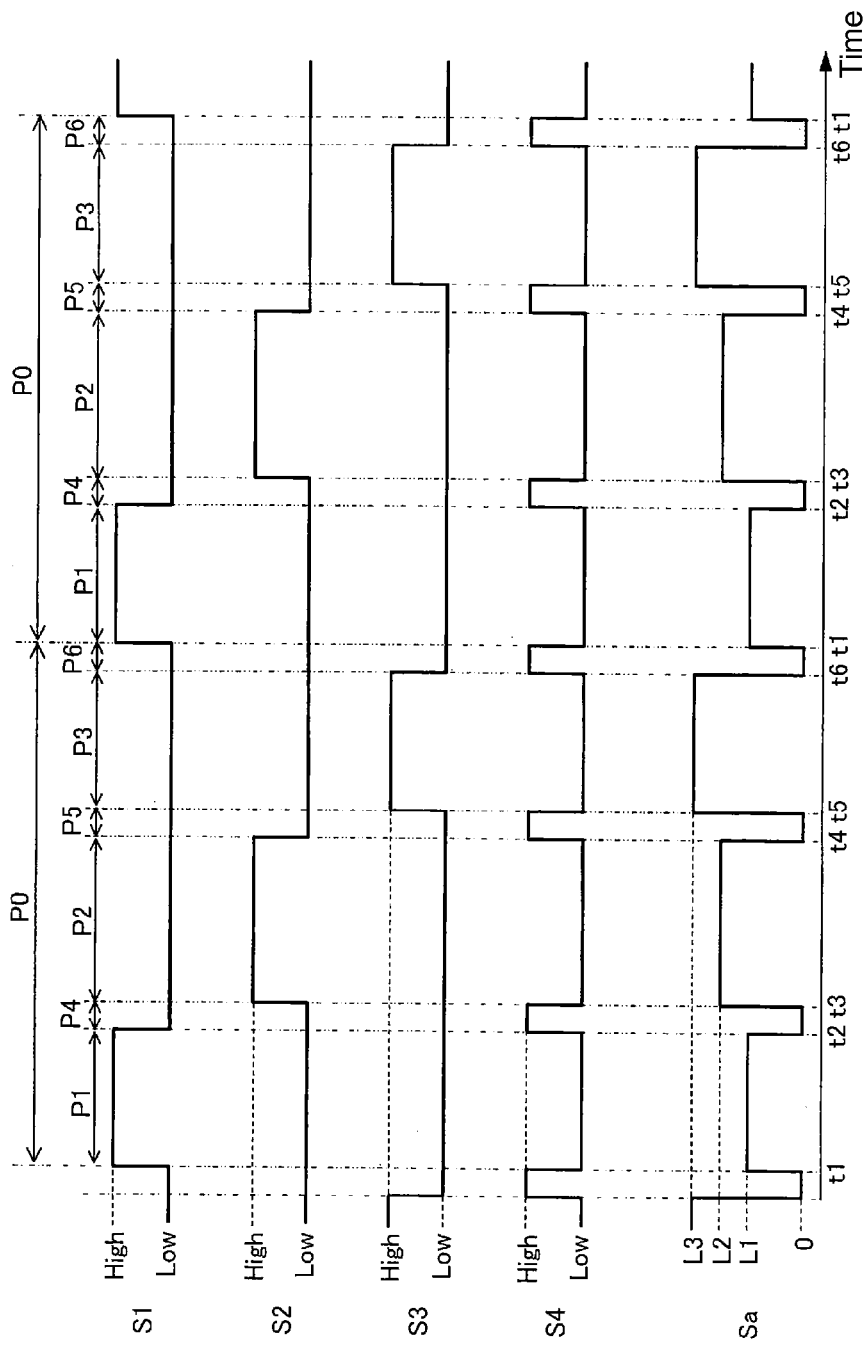
FIG. 2 is a chart showing changes in signals that are outputted by a calculation processing unit of the driving device according to Embodiment 1.

The signals Sa, S1, S2, S3, and S4 outputted by the calculation processing unit 11 will be described with reference to FIG. 2. FIG. 2 is a timing chart showing changes in levels of the signals Sa, S1, S2, S3, and S4 outputted by the calculation processing unit 11.

The signals Sa, S1, S2, S3, and S4 all have equal cycles, and these cycles of the signals are labeled P0.

The signals S1, S2, and S3 are all 1-bit signals.

The signals S1, S2, and S3 become high-level only once during one of the cycles P0.

The signals S1, S2, and S3 rise in this order during one of the cycles P0 and then fall in this order during one of the cycles P0.

A period P1 where the signal S1 is high level, a period P2 where the signal S2 is a high level, and a period P3 where the signal S3 is a high level are shifted in time from each other. There are time intervals between the period P1 and the period P2, between the period P2 and the period P3, and between the period P3 and the period P1.

In other words, the signal S2 rises at a prescribed period P4 from a time t2 when the signal S1 falls (see a time t3), the signal S3 rises at a prescribed period P5 from a time t4 when the signal S2 falls (see a time t5), the signal S1 rises at a prescribed period P6 from a time t6 when the signal S13 falls (see a time t1), the periods P4, P5, and P6 are shorter than the periods P1, P2, and P3. The sum of the periods P1 to P6 is equal to the cycle P0.

The length of the periods P4, P5, and P6 may be equal to each other or may be different from each other. The length of the periods P1, P2, and P3 may be equal to each other or may be different from each other.

The signal S4 becomes high level in accordance with the number (namely, 3) of the signals S1, S2, and S3 in one of the cycles P0. The signal S4 is high level in the periods P4, P5, and P6.

In other words, the signal S1 rises at the time t1 when the signal S4 falls, the signal S4 then rises at the time t2 when the signal S1 falls, the signal S2 then rises at the time t3 when the signal S4 falls, the signal S4 then rises at the time t4 when the signal S2 falls, the signal S3 then rises at the time t5 when the signal S4 falls, and the signal S4 then rises at the time t6 when the signal S3 falls.

The level of the signal Sa intermittently becomes zero such as in the period P4, the period P5 after that, and the period P6 after the period P5. The level of the signal Sa also stepwisely rises over the periods P1, P2, and P3, but is constant during the respective periods P1, P2, and P3.

In other words, the level of the signal Sa is L1 during the period P1 when the signal S1 is high level, the level of the signal Sa is zero during the period P4 when the signal S4 is high level, the level of the signal Sa is L2 (L2>L1) during the period P2 when the signal S2 is high level, the level of the signal Sa is zero during the period P5 when the signal S4 is high level, the level of the signal Sa is L3 (L3>L2) during the period P3 when the signal S3 is high level, and the level of the signal Sa is zero during the period P6 when the signal S4 is high level.

The level L3 is the large level, the level L1 is the middle level, and the level zero is the small level.

As shown in FIG. 1, the input terminal of the power circuit 20 is the input terminal of the driving device 10, and the output terminal of the power circuit 20 is the output terminal of the driving device 10.

The load 2 and the switching element 18 are connected in series between the output terminal of the power circuit 20 and a reference potential node (ground) 19.

If the load 2 is a semiconductor light-emitting device such as a light-emitting diode, laser diode, or organic EL device, then the positive terminal of the load 2 is connected to the output terminal of the power circuit 20 and the negative terminal of the load 2 is connected to the switching element 18.

The resistor 16 and the switching element 17 are connected in series between the output terminal of the power circuit 20 and the reference potential node 19.

The output capacitor 15 is connected between the output terminal of the power circuit 20 and the reference potential node 19.

Accordingly, the series circuit constituted of the load 2 and the switching element 18, the series circuit constituted of the resistor 16 and the switching element 17, and the output capacitor 15 are connected in parallel between them.

The switching elements 17 and 18 are bipolar or field effect transistors.

The power circuit 20 is a variable constant-voltage source or a variable constant-current source, or more specifically, a DC-DC converter that converts the direct-current power of the voltage value Vin to the direct-current power of the voltage value Vout or the current value Iout.

In other words, the power circuit 20 outputs the direct-current power of the output voltage value Vout or the output current value Iout corresponding to the level of the signal Sa.

The power circuit 20 uses a feedback control method in which the signal Sa inputted to the power circuit 20 sets target values at which feedback control is aimed.

If the power circuit 20 is a variable constant-voltage source, then the value Vout of the output voltage of the power circuit 20 is returned to the power circuit 20 as a detection value D, and the voltage value Vout is controlled at a level conforming to the signal Sa by the power circuit 20 controlling the value Vout of the output voltage on the basis of the difference between the detection value D and the level of the signal Sa.

If the power circuit 20 is a variable constant-current source, then the value Iout of the output current of the power circuit 20 is returned to the power circuit 20 as the detection value D, and the current value Iout will be controlled at a level conforming to the signal Sa by the power circuit 20 controlling the value Iout of the output current on the basis of the difference between the detection value D and the level of the signal Sa.

When the current value Iout is returned to the power circuit 20 as the detection value D, one terminal of a resistor is connected to the power circuit 20, and the other terminal of the resistor is connected to the load 2 and the resistor 16. The voltage of this resistor can be given as feedback to the power circuit 20 as the detection value D and the current value Iout.

If the load 2 is a semiconductor light-emitting device, then it is preferable that the value Iout of the output current of the power circuit 20 be returned to the power circuit 20 as the detection value D.

It is preferable that the power circuit 20 be a switching power circuit (a switching regulator), the control method of the power circuit 20 be a feedback control method using pulse-width modulation (PWM), and that the direct-current power of the voltage value Vout or the current value Iout be outputted by the power circuit 20 repeatedly turning the inputted direct-current ON and OFF.

In FIG. 1, a specific structure of the power circuit 20 is shown in which the power circuit 20 is a step-down switching regulator.

In other words, the power circuit 20 has a switching element 21, a rectifier element 22, an inductor 23, and a capacitor 24.

The switching element 21 is connected between the input terminal of the power circuit 20 and the negative terminal of the rectifier element 22, the positive terminal of the rectifier element 22 is connected to the reference potential node 19, the negative terminal of the rectifier element 22 is connected to one terminal of the inductor 23, one electrode of the capacitor 24 is connected to the other terminal of the inductor 23, and the other electrode of the capacitor 24 is connected to the reference potential node 19.

The point of connection of the inductor 23 and the capacitor 24 is the output terminal of the power circuit 20.

The switching element 21 is a bipolar or field effect transistor.

The output capacitor 15 is connected to the output terminal of the power circuit 20, and thus, the capacitor 24 may be omitted.

A power control unit 25 is a digital circuit or analog circuit that performs PWM control.

Namely, the detection value D and the signal Sa are inputted to the power control unit 25, and the power control unit 25 outputs a PWM signal of a certain cycle, which is shorter than the cycle P0 and the periods P1 to P6, to a control terminal (gate or base) of the switching element 21.

During each of the cycles of the PWM signal, the power control unit 25 reads the detection value D, calculates a duty cycle on the basis of the difference between the detection value D and the level of the signal Sa, and then outputs the PWM signal of this duty cycle to the control terminal of the switching element 21.

This makes the voltage value Vout or the current value Iout of the power circuit 20 output correspond to the level of the signal Sa.

The power circuit 20 may be a step-up switching power circuit (a switching regulator).

An enable terminal (EN) is disposed on the power circuit 20, on the power control unit 25 in particular.

A signal expressing the logical sum of the signals S1, S2, S3, and S4 is inputted to this enable terminal.

In other words, the calculation processing unit 11 inputs the signals S1 to S4 into the respective four input terminals of the OR gate 13, and the OR gate 13 calculates the logical sum of the signals S1 to S4 and outputs a signal expressing this logical sum to the enable terminal of the power control unit 25.

During the respective cycles P0, the signals S1 to S4 do not all become low level at the same time (see FIG. 2); therefore, the output signal of the OR gate 13 is always high level, the power control unit 25 is always activated, and the power control circuit 25 is always operating.

The calculation processing unit 11 inputs the signals S1 to S3 into the respective three input terminals of the OR gate 14, and the OR gate 14 calculates the logical sum of the signals S1 to S3 and outputs a signal expressing this logical sum to the control terminal (gate or base) of the switching element 18.

Therefore, when any of the signals S1 to S3 are high level (see the periods P1, P2, and P3 in FIG. 2), then the switching element 18 is ON, and when all of the signals S1 to S3 are low level (see the cycles P4, P5, and P6 in FIG. 2), then the switching element 18 is OFF.

The calculation processing unit 11 outputs the signal S4 to the control terminal (gate or base) of the switching element 17.

Therefore, when the signal S4 is high level (see the cycles P4, P5, and P6 in FIG. 2), then the switching element 17 is ON, when the signal S4 is low level (see the cycles P1, P2, and P3 in FIG. 2), then the switching element 17 is OFF.

Next, the operation of the driving device 10 will be explained.

When the calculation processing unit 11 raises the signal Sa to the level L1 (see the time t1 in FIG. 2), then the output voltage value Vout or the output current value Iout of the power circuit 20 rises, and in the period P1 after this, the voltage value Vout or the current value Iout is maintained at a value equivalent to the level L1 of the signal Sa.

During this, the output capacitor 15 is charged, and the output voltage of the power circuit 20 is smoothed by the output capacitor 15.

In the period P1 the switching element 17 is OFF and the switching element 18 is ON, and thus, the power of the output voltage value Vout or the output current value Iout is supplied to the load 2.

Thereafter, the calculation processing unit 11 lowers the signal Sa to zero (see the time t2 in FIG. 2). Then, the output voltage value Vout or the output current value Iout of the power circuit 20 are lowered, and in the period P4 after this, the voltage value Vout or the current value Iout is maintained at zero.

The output capacitor 15 discharges during the beginning of the period P4.

In the period P4, the switching element 17 is ON and the switching element 18 is OFF; therefore, the current caused by the discharge of the output capacitor 15 flows to the resistor 16 and the switching element 17.

Furthermore, in the beginning of the period P4 the counter-electromotive force of the inductor 23 is released through the resistor 16 and the switching element 17.

As a result, it is possible to suppress a large jump in output voltage of the power circuit 20 in the beginning of the period P2 thereafter.

The period P4 is a period when the voltage of the output terminal of the power circuit 20 is lowered by discharge of the output capacitor 15.

In other words, the length of the period P4 is such that the voltage of the output terminal of the power circuit 20 during the period P4 is lowered to a voltage that is less than the voltage applied to the load 2 during the period P2 thereafter.

If the power circuit 20 is a current-controlled power circuit, then the output current value Iout will become zero during the period P4.

"Zero" is a safety value with a margin, and is a value such that the voltage of the output terminal of the power circuit 20 during the period P4 will be lower than the voltage applied to the load 2 during the period P2 thereafter.

If the power circuit 20 is a voltage-controlled power circuit, then the output voltage value Vout during the period P4 is zero, and "zero" is the value such that the voltage of the output terminal of the power circuit 20 will be lower than the voltage (equivalent to the level L2) applied to the load 2 during the period P2 thereafter.

Thereafter, the calculation processing unit 11 raises the signal Sa to the level L2 (see the time t3 in FIG. 2). Then, the output voltage value Vout or the output current value Iout of the power circuit 20 rises.

In the period P2 thereafter, the voltage value Vout or the current value Iout is maintained at a value corresponding to the level L2 of the signal Sa, and the power of the output voltage value Vout or the output current value Iout is supplied to the load 2.

During this, the output capacitor 15 is charged, and the output voltage of the power circuit 20 is smoothed by the output capacitor 15.

Thereafter, the calculation processing unit 11 lowers the signal Sa to zero (see the time t4 in FIG. 2). Then, the output voltage value Vout or the output current value Iout of the power circuit 20 are lowered, and in the period P5 after this the voltage value Vout or the current value Iout is maintained at zero.

In the beginning of the period P5, the discharge current of the output capacitor 15 flows to the resistor 16 and the switching element 17, and the counter-electromotive force of the inductor 23 is released through the resistor 16 and the switching element 17.

The period P5 is when the voltage of the output terminal of the power circuit 20 is lowered by discharge of the output capacitor 15.

In other words, the length of the period P5 is such that the voltage of the output terminal of the power circuit 20 during the period P5 is lowered to a voltage that is less than a voltage applied to the load 2 during the period P3 thereafter.

If the power circuit 20 is a current-controlled power circuit, then the output current value Iout will become zero during the period P5.

"Zero" is a safety value with a margin, and is a value such that the voltage of the output terminal of the power circuit 20 during the period P5 will be lower than the voltage applied to the load 2 during the period P3 thereafter.

If the power circuit 20 is a voltage-controlled power circuit, then the output voltage value Vout during the period P5 is zero, and "zero" is the value such that the voltage of the output terminal of the power circuit 20 will be lower than the voltage (equivalent to the level L3) applied to the load 2 during the period P3 thereafter.

Thereafter, the calculation processing unit 11 raises the signal Sa to the level L3 (see the time t5 in FIG. 2). Then, the output voltage value Vout or the output current value Iout of the power circuit 20 rises.

In the period P3 thereafter, the voltage value Vout or the current value Iout is maintained at a value corresponding to the level L3 of the signal Sa, and the power of the output voltage value Vout or the output current value Iout is supplied to the load 2.

During this, the output capacitor 15 is charged, and the output voltage of the power circuit 20 is smoothed by the output capacitor 15.

Thereafter, the calculation processing unit 11 lowers the signal Sa to zero (see the time t6 in FIG. 2). Then, the output voltage value Vout or the output current value Iout of the power circuit 20 is lowered, and in the period P6 after this the voltage value Vout or the current value Iout is maintained at zero.

In the beginning of the period P6, the discharge current of the output capacitor 15 flows to the resistor 16 and the switching element 17, and the counter-electromotive force of the inductor 23 is released through the resistor 16 and the switching element 17.

The period P6 is a period when the voltage of the output terminal of the power circuit 20 is lowered by discharge of the output capacitor 15.

In other words, the length of the period P6 is such that the voltage of the output terminal of the power circuit 20 during the period P6 is lowered to a voltage that is less than the voltage of the load 2 during the period P1 thereafter.

If the power circuit 20 is a current-controlled power circuit, then the output current value Iout will become zero during the period P6.

"Zero" is a safety value with a margin, and is a value such that the voltage of the output terminal of the power circuit 20 during the period P6 will be lower than the voltage applied to the load 2 during the period P1 thereafter.

If the power circuit 20 is a voltage-controlled power circuit, then the output voltage value Vout during the period P6 is zero, and "zero" is the value such that the voltage of the output terminal of the power circuit 20 will be lower than the voltage (equivalent to the level L1) applied to the load 2 during the period P1 thereafter.

However, if the period P6 is absent and the period P3 shifts directly to the period P1, then the output voltage of the power circuit 20 during the period P3 will be higher than the output voltage of the power circuit 20 during the period P1, thereby allowing inrush currents caused by the difference in output voltage to flow into the load 2.

However, in the present embodiment, the output capacitor 15 discharges during the period P6; therefore, it is possible to prevent inrush currents flowing to the load 2 during the beginning of the period P1.

In the driving device of Embodiment 1 described above, a discharge is performed at each change in voltage, and thus, suitable driving control is possible without direct management regarding the size of the voltage levels L1, L2, and L3 or consideration of the order thereof.

The voltage levels may also be controlled as in Embodiment 2, described below, if the size of the voltage levels L1, L2, and L3 and the order thereof is known.

In the driving device of Embodiment 1 described above, the signal Sa during the periods (the periods P4, P5, and P6) of the respective discharges going through the switching element 17 is zero (a reference potential, for example).

If the power circuit 20 is a voltage-control power circuit, then it is not necessary for the level of the signal Sa during the periods (the periods P4, P5, and P6) of the respective discharges going through the switching element 17 to be zero, and the level of the signal may be a voltage that is less than or equal to a voltage that is possibly applied to the load 2 next, as described above.

In other words, the level of the signal Sa during the period P4 may be the level L2 or lower, the level of the signal Sa during the period P5 may be the level L3 or lower, and the level of the signal Sa during the period P6 may be the level L1 or lower.

In this example, when the level of the signal Sa during the period P4 is above the level L1 and lower than or equal to the level L2, a charge is stored in the output capacitor 15 during the period P4, and when the level of the signal Sa during the period P5 is above the level L2 and lower than or equal to the level L3, then a charge is stored in the output capacitor 15 during the period P5.

If the power circuit 20 is of a current-control type, then the voltage applied to the load 2 directly after the end of the periods in question (the periods P4, P5, and P6) when the respective discharges go through the switching element 17 (directly after the start of the period P1, the period P2, and the period P3) cannot be ascertained; thus, as shown in FIG. 2, in Embodiment 1 the signal Sa is zero.

Embodiment 2

A driving device of Embodiment 2 has a circuit configuration that is similar to the driving device 10 (see FIG. 1) of Embodiment 1.

The driving device of Embodiment 2 differs from the driving device 10 in Embodiment 1 in the operation of a program 12a and an calculation processing unit 11 based on this program 12a.

Thus, an explanation of the common points between the driving device of Embodiment 2 and the driving device 10 of Embodiment 1 will be omitted, and mainly the differences will be explained below.

In a manner similar to Embodiment 1, if a load 2 is a light source, then the device provided with the driving device and the load 2 of Embodiment 2 is a light-emitting device, and this light-emitting device can be applied to a projection device.

Figure 3:
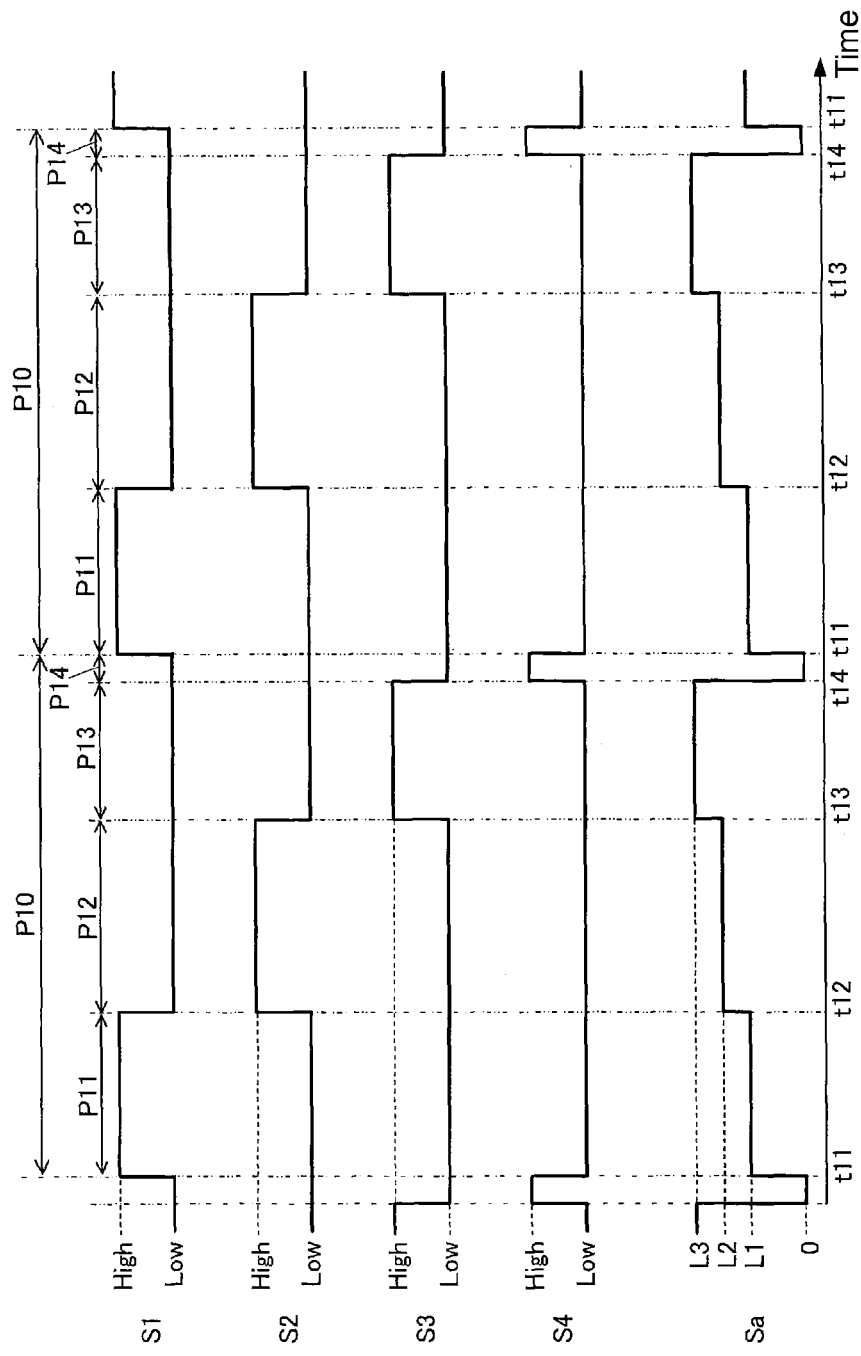
FIG. 3 is a chart showing changes in signals that are outputted by a calculation processing unit of a driving device according to Embodiment 2 of the present invention.

FIG. 3 is a timing chart showing changes in the level of signals Sa, S1, S2, S3, and S4 that are outputted by the calculation processing unit 11 of Embodiment 2.

As shown in FIG. 3, the signals Sa, S1, S2, S3, and S4 are all signals with equal cycles, and a single one of these cycles of the signals is labeled P10. The signals S1, S2, S3, and S4 are 1-bit signals that each become high level only once during a single one of the cycles P10. The signals S1, S2, S3, and S4 rise during a single one of the cycles P10 in this order and also fall during a single one of the cycles P10 in this order.

A period P11 where the signal S1 is high level, a period P12 where the signal S2 is high level, a period P13 where the signal S3 is high level, and a period P14 where the signal S4 is high level are shifted in time from each other. There is no interval between the period P11 and the period P12. This is similar for between the period P12 and the period P13, the period P13 and the period P14, and the period P14 and the period P11.

The sum of the periods P11 to P14 is equal to the cycle P10. The period P14 is shorter than the respective periods P11 to P13. The periods P11 to P14 are sufficiently longer than the cycle of the PWM signal outputted by a power control unit 25. The length of the periods P11 to P13 may be equal to each other or may be different from each other.

The signal S1 rises when the signal S4 falls (see time t11), the signal S2 rises when the signal S1 falls (see time t12), the signal S3 rises when the signal S2 falls (see time t13), the signal S4 rises when the signal S3 falls (see time t14), The level of the signal Sa intermittently becomes zero as in the period P14, and also stepwisely rises over the periods P11, P12, and P13, but is constant during these periods P11, P12, and P13.

The level of the signal Sa rises during the same cycle in synchronization with the rises of the signals S1, S2, and S3, and the level of the signal Sa during the respective periods P11, P12, and P13 is maintained at a constant level.

In other words, the level of the signal Sa is L1 during the period P11 when the signal S1 is high level, thereafter the level of the signal Sa is L2 (L2>L1) during the period P12 when the signal S2 is high level, thereafter the level of the signal Sa is L3 (L3>L2) during the period P13 when the signal S3 is high level, and thereafter the level of the signal Sa is zero during the period P14 when the signal S4 is high level.

A signal expressing the logical sum of the signals S1, S2, and S3 is inputted to the control terminal of a switching element 18, and thus (see FIG. 1), when any of the signals S1 to S3 are high level (see the periods P11, P12, and P13 in FIG. 3), then the switching element 18 is ON, and when all of the signals S1 to S3 are low level (see the period 14 in FIG. 3), then the switching element 18 is OFF.

The signal S4 is inputted to the control terminal of a switching element 17 (see FIG. 1), and thus, when the signal S4 is high level (see the period P14 in FIG. 3), the switching element 17 is ON, and when the signal S4 is low level (see the periods P11, P12, and P13 in FIG. 3), the switching element 17 is OFF.

Accordingly, the calculation processing unit 11 turns the switching element 17 ON and OFF, and turns the switching element 18 ON and OFF in the opposite phase to the switching element 17.

Next, the operation of the driving device of Embodiment 2 will be explained.

If the calculation processing unit 11 raises the signal Sa to the level L1 (see the time t11 in FIG. 3), then an output voltage value Vout or an output current value Iout of a power circuit 20 will rise, and an output capacitor 15 will be charged.

In the period P11 thereafter, the voltage value Vout or the current value Iout is maintained at a value corresponding to the level L1 of the signal Sa, and the power of the output voltage value Vout or the output current value Iout is supplied to the load 2, thereby smoothing the output voltage of the power circuit 20 with the output capacitor 15.

Thereafter, the calculation processing unit 11 raises the signal Sa from the level L1 to the level L2 (see the time t12 in FIG. 3). Then, the output voltage value Vout or the output current value Iout of the power circuit 20 rises and the output capacitor 15 is further charged.

The signal Sa rises from the level L1 to the level L2; therefore, there is no discharge of the output capacitor 15 and no inrush currents will flow to the load 2 during the beginning of the period P12.

In the period P12 thereafter, the voltage value Vout or the current value Iout is maintained at a value corresponding to the level L2 of the signal Sa, and the power of the output voltage value Vout or the output current value Iout is supplied to the load 2, thereby smoothing the output voltage of the power circuit 20 with the output capacitor 15.

Thereafter, the calculation processing unit 11 raises the signal Sa from the level L2 to the level L3 (see the time t13 in FIG. 3) Then, the output voltage value Vout or the output current value Iout of the power circuit 20 rises and the output capacitor 15 is further charged.

The signal Sa rises from the level L2 to the level L3; therefore, there is no discharge of the output capacitor 15 and no inrush currents will flow to the load 2 during the beginning of the period P13.

In the period P13 thereafter, the voltage value Vout or the current value Iout is maintained at a value corresponding to the level L3 of the signal Sa, and the power of the output voltage value Vout or the output current value Iout is supplied to the load 2, thereby smoothing the output voltage of the power circuit 20 with the output capacitor 15.

Thereafter, the calculation processing unit 11 lowers the signal Sa from the level L3 to zero (see the time t14 in FIG. 3) Then, the output voltage value Vout or the output current value Iout of the power circuit 20 will fall.

Since the switching element 17 is ON and the switching element 18 is OFF, the output capacitor 15 discharges and this discharge current flows to a resistor 16 and the switching element 17.

Furthermore, the counter-electromotive force of an inductor 23 is released through the resistor 16 and the switching element 17.

In the period P14 thereafter, the voltage value Vout or the current value Iout is maintained at zero.

The length of the period P14 allows the voltage of the output terminal of the power circuit 20 to be reduced by discharging the charge of the output capacitor 15.

In other words, the length of the period P14 is such that the voltage of the output terminal of the power circuit 20 during the period P14 is lowered to the voltage of the load 2 during the period P11 thereafter.

In the present embodiment it is also possible to prevent inrush currents flowing to the load 2 in the beginning of the period P11, due to the output capacitor 15 discharging during the period P14.

The output capacitor 15 only discharges once during one of the cycles P10; therefore, it is possible to lengthen the time (the sum of the periods P11, P12, and P13) in which power is supplied to the load 2.

In the driving device of Embodiment 2 described above, the level of the signal Sa during the period (the period P14) of the respective discharges going through the switching element 17 is zero (a reference potential, for example).

If the power circuit 20 is a voltage-control power circuit, then it is not necessary for the level of the signal Sa during the period (the period 14) of the respective discharges going through the switching element 17 to be zero (a reference potential, for example), and the level of the signal may be a voltage that is less than or equal to a voltage (the voltage during the period P11) that is possible to be applied to the load 2 next, as described above.

In other words, the level of the signal Sa during the period P14 may be the level L1 or below.

If the power circuit 20 is of a current-control type, then the voltage applied to the load 2 directly after the end of the period (the period 14) when the respective discharges go through the switching element 17 (directly after the start of the period P11) cannot be ascertained; thus, as shown in FIG. 3, in Embodiment 2 the signal Sa is zero.

Furthermore, in the driving device of Embodiment 2, the output current value or the output voltage value of the power circuit 20 is controlled so as to stepwisely increase when the number of output levels are three or above, as described above.

In this manner, the amount of discharges can be reduced to one, and the time (the sum of the periods P11, P12, and P13) in which power is supplied to the load 2 can be made longer.

Furthermore, in the driving device of Embodiment 2 described above, it is preferable that the discharge period (the period P14) be controlled in accordance with the level difference between L3 and L1, and that the time (the sum of the periods P11, P12, and P13) in which the power is supplied to the load 2 be controlled to be made as long as possible.

The length of the period P14 is set to conform to the difference between the level L3 and the level L1, and the period P14 is controlled to be this length by the control unit 11 turning the signal S4 ON in accordance with this configuration.

Embodiment 3

Figure 4:
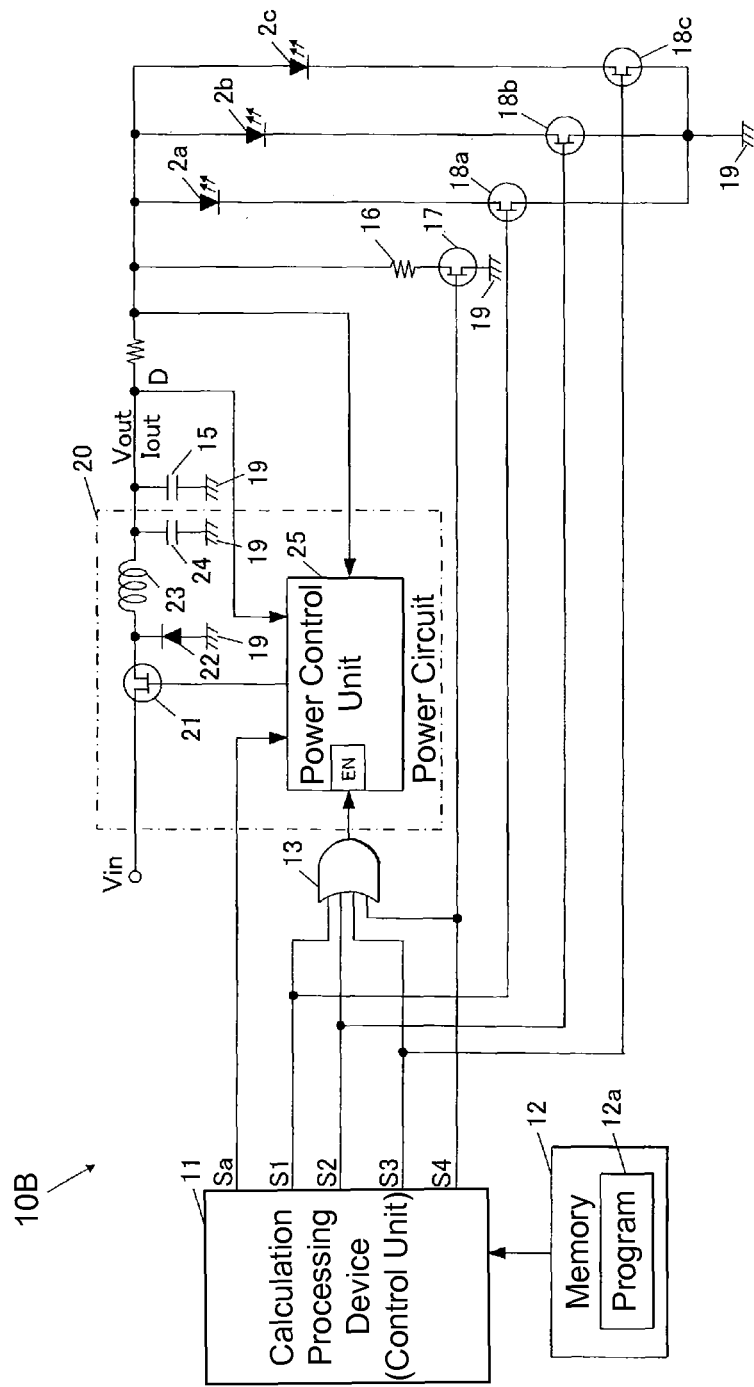
FIG. 4 is a circuit diagram of a driving device according to Embodiment 3 of the present invention.

FIG. 4 is a block diagram of a driving device 10B of Embodiment 3.

Constituting elements that are shared among the driving device 10B of Embodiment 3 and the driving device 10 of Embodiment 1 are given the same reference characters, and an explanation of the shared points of the driving device in Embodiment 3 and the driving device 10 in Embodiment 1 will be omitted, with mainly the differences therebetween being explained.

The driving device 10 of Embodiment 1 drives the single load 2.

In contrast, the driving device 10B of Embodiment 3 drives three loads 2a, 2b, and 2c. The driving device 10 of Embodiment 1 has the OR gate 14. In contrast, the driving device 10B of Embodiment 3 does not have the OR gate 14. The driving device 10 of Embodiment 1 has the single switching element 18.

In contrast, the driving device 10B of Embodiment 3 has three switching elements 18a, 18b, and 18c.

The loads 2a, 2b, and 2c are semiconductor light-emitting devices that have diode characteristics (rectifying characteristics), such as light-emitting diodes, organic light-emitting diodes, and laser diodes.

In the loads 2a, 2b, and 2c, the load 2a has the smallest forward voltage drop (Vf), and the load 2c has the largest forward voltage drop.

The loads 2a, 2b, and 2c may be a device other than semiconductor light-emitting devices (such as incandescent lamps, discharge lamps, resistors, heaters, and motors, for example).

If the loads 2a, 2b, and 2c are light sources such as a semiconductor light-emitting device, then the device having the driving device 10B and the loads 2a, 2b, and 2c is a light-emitting device.

The positive terminals of the loads 2a, 2b, and 2c are connected to the output terminal of a power circuit 20 through a resistor 30.

The negative terminals of the loads 2a, 2b, and 2c are connected to a reference potential node 19 through the respective switching elements 18a, 18b, and 18c.

A current value Iout is returned to a power control unit 25 of the power circuit 20 as a detection value D.

A calculation processing unit 11 outputs a signal S1 to a control terminal of the switching element 18a, outputs a signal S2 to a control terminal of the switching element 18b, and outputs a signal S3 to a control terminal of the switching element 18c.

The waveforms of the signals Sa, S1, S2, S3, and S4 outputted by the calculation processing unit 11 are as shown in FIGS. 2 and 3.

The operation of the driving device 10B will be explained when the waveform of the signals Sa, S1, S2, S3, and S4 are as shown in FIG. 2.

In a period P1, the switching element 18a is ON, the power of the output current value Iout according to a level L1 of the signal Sa is supplied to the load 2a, and the load 2a then emits light.

In a period P4, a switching element 17 is ON, the current from the discharge of an output capacitor 15 flows to a resistor 16 and the switching element 17, and the output current value Iout is maintained at zero.

In a period P2, the switching element 18b is ON, the power of the output current value Iout according to a level L2 of the signal Sa is supplied to the load 2b, and the load 2b then emits light.

In a period P5, the switching element 17 is ON, the current from the discharge of the output capacitor 15 flows to the resistor 16 and the switching element 17, and the output current value Iout is maintained at zero.

In a period P3, the switching element 18c is ON, the power of the output current value Iout according to a level L3 of the signal Sa is supplied to the load 2c, and the load 2c then emits light.

In a period P6, the switching element 17 is ON, the current from the discharge of the output capacitor 15 flows to the resistor 16 and the switching element 17, and the output current value Iout is maintained at zero.

The operation of the driving device 10B will be explained when the waveform of the signals Sa, S1, S2, S3, and S4 are as shown in FIG. 3.

In a period P11, the switching element 18a is ON, the power of the output current value Iout according to the level L1 of the signal Sa is supplied to the load 2a, and the load 2a then emits light.

In a period P12, the switching element 18b is ON, the power of the output current value Iout according to the level L2 of the signal Sa is supplied to the load 2b, and the load 2b then emits light.

In a period P13, the switching element 18c is ON, the power of the output current value Iout according to the level L3 of the signal Sa is supplied to the load 2c, and the load 2c then emits light.

In a period P14, the switching element 17 is ON, the current from the discharge of the output capacitor 15 flows to the resistor 16 and the switching element 17, and the output current value Iout is maintained at zero.

Accordingly, in one cycle P10, power is supplied to the loads 2a, 2b, and 2c in ascending order of the forward voltage drops (Vf) thereof.

Feedback control may be performed such that a voltage value Vout is returned to the power control unit 25 of the power circuit 20 as the detection value D and the output voltage value Vout of the power circuit 20 conforms to the level of the signal Sa.

As in the present embodiment, when having the three switching elements 18a, 18b, and 18c, and driving the three loads 2a, 2b, and 2c, it is possible to suitably drive the loads and to prevent inrush currents to these three loads 2a, 2b, and 2c and damage of the loads by the electric charge that causes inrush currents being discharged via the switching element 17 at a suitable timing.

Embodiment 4

A projection device having the light-emitting device according to Embodiment 3 will be explained with reference to FIG. 5.

Figure 5:
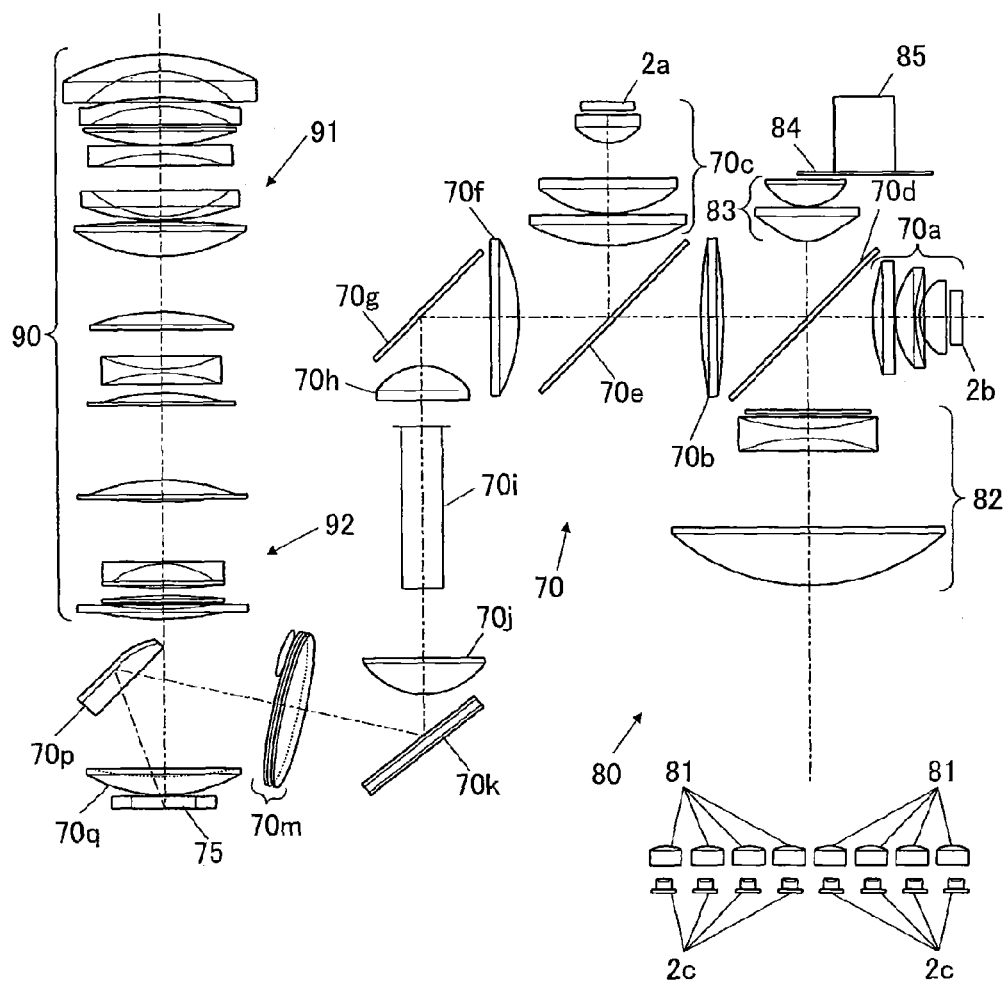
FIG. 5 is a plan view of an optical unit in a projection device according to Embodiment 4 of the present invention.

FIG. 5 is a plan view of optical units of the projection device.

As shown in FIG. 5, the projection device has a light-emitting device that includes a driving device 10B and loads (semiconductor light-emitting devices) 2a, 2b, and 2c, and also has an excited phosphor conversion device 80, an optical system 70, a display element 75, a projection lens unit 90, and the like.

The load 2b is a blue light emitting diode, and the load 2a is a red light emitting diode.

The load 2a and the load 2b are arranged such that the optical axes thereof are orthogonal to each other.

There are a plurality of the loads 2c. These loads 2c are arranged in a two-dimensional array.

The wavelength band of laser excitation light emitted from the loads 2c is a blue wavelength band or ultraviolet wavelength band, but is not particularly limited thereto. The loads 2c are excitation light laser diodes. The loads 2c and the load 2b are arranged such that the optical axes thereof are orthogonal to each other.

The excited phosphor conversion device 80 generates green fluorescent light from the excitation light emitted by the loads 2c.

The excited phosphor conversion device 80 has a plurality of collimator lenses 81, a lens group 82, a lens group 83, a phosphor wheel 84, and a spindle motor 85.

The collimator lenses 81 face the respective loads 2c, and the laser excitation light emitted by the respective loads 2c is collimated by the collimator lenses 81.

The lens group 82 and the lens group 83 are arranged on the same optical axis. The lens group 82 and the lens group 83 gather the luminous flux groups of the laser excitation light collimated by the collimator lenses 81 and condense these.

The phosphor wheel 84 is arranged facing the surfaces of the plurality of the loads 2c arranged in a two-dimensional array.

The lens group 82 and the lens group 83 are arranged between the phosphor wheel 84 and the loads 2c, and the optical axes of the lens group 82 and the lens group 83 is orthogonal to the phosphor wheel 84. The optical axes of the lens groups 82 and 83 is parallel to the optical axis of the loads 2c and orthogonal to the optical axis of the load 2b.

The laser excitation light condensed by the lens group 82 and the lens group 83 illuminates the phosphor wheel 84.

The phosphor wheel 84 has a green phosphor that emits green light when excited by the laser excitation light formed on the mirror wheel. Therefore, green light is emitted from this green phosphor by the laser excitation light illuminating the green phosphor of the phosphor wheel 84.

The phosphor wheel 84 is connected to the spindle motor 85 and rotated by the spindle motor 85.

The plurality of loads 2c that emit excitation light may instead be a single light-emitting device that emits green light (a light-emitting diode).

In this case, the loads 2c are provided at a location where the optical axes of the phosphor wheel 84 and the lens group 83 intersect, and the collimator lenses 81 and the lens group 82 can be omitted.

Next, the optical system 70 will be explained in detail.

The optical system 70 combines the optical axis of red light emitted by the load 2a, the optical axis of green light emitted by the phosphor wheel 84, and the optical axis of blue light emitted by the load 2b, and illuminates this red light, green light, and blue light on the display element 75.

This optical system 70 has a lens group 70a, a lens 70b, a lens group 70c, a first dichroic mirror 70d, a second dichroic mirror 70e, a lens 70f, a reflective mirror 70g, a lens 70h, an integrator optical element 70i, a lens 70j, an optical axis conversion mirror 70k, a condensing lens group 70m, an illumination mirror 70p, and an illumination lens 70q.

The lens group 70a faces the load 2b.

The lens group 70a and the lens 70b are arrayed such that the optical axes thereof form a straight line.

The lens group 70a and the lens 70b are arranged such that the optical axes thereof are orthogonal to the optical axes of the lens group 82 and the lens group 83 between the lens group 82 and the lens group 83.

The first dichroic mirror 70d is arranged between the lens group 70a and the lens 70b and arranged between the lens group 82 and the lens group 83.

The first dichroic mirror 70d is at a 45° incline with respect to the optical axes of the lens groups 82 and 83 and at a 45° incline with respect to the optical axes of the lens group 70a and the lens 70b.

The first dichroic mirror 70d allows excitation light of a certain wavelength band (blue excitation light, for example) emitted by the loads 2c to pass through to the phosphor wheel 84 and allows blue wavelength band light emitted by the load 2b to pass through to the second dichroic mirror 70e. The first dichroic mirror 70d reflects green wavelength band light emitted by the phosphor wheel 84 towards the second dichroic mirror 70e.

The lens group 70c faces the load 2a.

The lens group 70c is arranged such that the optical axis thereof is orthogonal to the optical axes of the lens group 70a and the lens 70b on the side of the lens 70b opposite to the load 2b and the first dichroic mirror 70d.

The second dichroic mirror 70e is arranged on the side of the lens group 70c opposite to the load 2a and arranged on the side of the lens 70b opposite to the first dichroic mirror 70d.

The second dichroic mirror 70e is at a 45° incline with respect to the optical axis of the lens group 70c and at a 45° incline with respect to the optical axis of the lens group 70a and the lens 70b.

The second dichroic mirror 70e allows blue and green wavelength band light from the first dichroic mirror 70d to pass through towards the lens 70f and reflects red wavelength band light emitted by the load 2a to the lens 70f.

The lens 70f is arranged on the side of the second dichroic mirror 70e opposite to the lens 70b. The lens 70f is arranged such that the optical axis thereof overlaps the optical axes of the lens 70b and the lens group 70a.

The lens 70h, the integrator optical element 70i, and the lens 70j are arranged such that the optical axes thereof form a straight line. The optical axes of the lens 70h, the integrator optical element 70i, and the lens 70j are orthogonal to the optical axes of the lens 70f, the lens 70b, and the lens group 70a.

The reflective mirror 70g is arranged at a location where the optical axis of the lens 70h and the optical axis of the lens 70f intersect each other.

The reflective mirror 70g is at a 45° incline with respect to the optical axes of the lenses 70f and 70b, and the lens group 70a, and at a 45° incline with respect to the optical axes of the lens 70h, the integrator optical element 70i, and the lens 70j.

Red light, green light, and blue light are condensed by the lens 70f and the lens 70h and reflected to the integrator optical element 70i by the reflective mirror 70g.

The integrator optical element 70i is a light tunnel or a light road.

Light that has entered the light-receiving face of the integrator optical element 70i on the lens 70h side is guided inside the integrator optical element 70i to the edge face (light-exiting surface) on the opposite side thereto, and the light exits from this edge face on the side opposite to the lens 70h side.

The integrator optical element 70i makes uniform the luminance distribution of emitted light along the face which is orthogonal to the optical axis of the emitted light.

The lens 70j projects the red light, green light, and blue light guided by the integrator optical element 70i towards the optical axis conversion mirror 70k and condenses this light.

The optical axis conversion mirror 70k reflects the red light, green light, and blue light projected by the lens 70j towards the condensing lens group 70m.

The condensing lens group 70m projects the red light, green light, and blue light reflected by the optical axis conversion mirror 70k towards the illumination mirror 70p and condenses this light.

The illumination mirror 70p reflects the light projected by the condensing lens group 70m towards the display element 75. The illumination lens 70q projects the light reflected by the illumination mirror 70p to the display element 75.

The display element 75 is a reflective spatial light modulator, or more specifically, a digital micro-mirror device (DMD).

The display element 75 is driven by a driver. Namely, when the display element 75 is illuminated with red light, the time ratio (duty cycle) of the red light being reflected to the projection lens unit 90 (described later) for each movable micromirror is controlled by the respective movable micro-mirrors of the display element 75 being controlled (PWM control, for example).

In this manner, a red color image is formed by the display element 75. This is similar for when green light or blue light illuminate the display element 75.

The display element 75 may be a transmissive spatial light modulator (a liquid crystal shutter array panel: a so-called liquid crystal display apparatus, for example) instead of a reflective spatial light modulator.

If the display element 75 is a transmissive spatial light modulator, then the optical design of the optical system 70 is changed such that the display element 75 is illuminated from the side opposite to the lens unit (projection optical system) 90.

The projection lens unit 90 faces the display element 75, and the optical axis of the projection lens unit 90 extends in the front and back while intersecting (specifically, being orthogonal to) the display element 75. The projection lens unit 90 projects light reflected by the display element 75 forward, thereby projecting an image formed by the display element 75 on a screen. This projection lens unit 90 includes a movable lens group 91, a fixed lens group 92, and the like. The focal length of the projection lens unit 90 can be adjusted by the movement of the movable lens group 91, and the projection lens unit 90 can focus.

The projection device shown in FIG. 5 may be applied to a rear-projection display device.

A rear-projection display device includes a transmissive screen, and a projection device that is provided on the rear side of this transmissive screen and that projects onto this transmissive screen from the rear side of the transmissive screen.

The shape of the transmissive screen is not limited to being rectangular, and shapes of people, animals, or other characters may be used.

Embodiments of the present invention were described above, but the technical scope of the present invention is not limited thereto, and is defined on the basis of the disclosures in the claims.

Furthermore, any configuration of an equivalent scope additionally having a modification that is unrelated to the essence of the present invention from the disclosures in the claims is also included in the technical scope of the present invention.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A driving device, comprising:
a power circuit that can modify an output current or an output voltage of an output terminal configured to have a load connected thereto;
an output capacitor connected between the output terminal of the power circuit and a reference potential node;
a switching device connected between the output terminal of the power circuit and the reference potential node; and
a control unit that controls the output current or the output voltage of the power circuit,
wherein the control unit turns the switching device ON and OFF, and
wherein the control unit controls the output current or the output voltage of the power circuit while the switching device is ON such that a voltage of the output terminal of said power circuit while the switching device is ON becomes less than or equal to a voltage applied to the load while said switching device is OFF thereafter.

2. The driving device according to claim 1,
wherein the control unit sets the output current or the output voltage of the power circuit to zero while the switching device is ON.

3. The driving device according to claim 1,
wherein the control unit sets the output voltage of the power circuit while the switching device is ON to less than or equal to the output voltage while the switching device is OFF thereafter.

4. The driving device according to claim 1,
wherein the control unit maintains the same output voltage or output current of the power circuit while the switching device is OFF.

5. The driving device according to claim 1,
wherein the control unit stepwisely increases the output voltage or the output current of the power circuit while the switching device is OFF.

6. The driving device according to claim 1,
wherein the control unit lowers the output voltage or the output current of the power circuit immediately after the switching device switches from ON to OFF to less than or equal to the output voltage or the output current immediately before the switching device switches from OFF to ON.

7. The driving device according to claim 1,
wherein a length of the switching device being ON is such that the voltage of the output terminal of the power circuit becomes less than or equal to a voltage applied to the load while the switching device is OFF thereafter.

8. The driving device according to claim 1,
wherein a length of the switching device being ON is set based on a difference between the output voltage or the output current of the power circuit immediately before said switching device is switched from OFF to ON and the output voltage or the output current immediately after the switching device is switched from ON to OFF.

9. The driving device according to claim 1, further comprising:
a second switching device that is between the output terminal of the power circuit and the reference potential node, the second switching device configured to be connected in series with the load,
wherein the control unit turns the second switching device ON and OFF in a phase opposite to the switching device being turned ON and OFF.

10. The driving device according to claim 1, further comprising:
a plurality of second switching devices, each configured to be connected to a respective load, one end connected to the reference potential node and another end connected to said respective load,
wherein the control unit turns the plurality of the second switching devices ON and OFF such that the plurality of second switching devices are sequentially ON with time intervals therebetween,
wherein the control unit turns OFF the switching device when any one of the plurality of the second switching devices are ON, and
wherein the control unit turns ON the switching device when all of the plurality of the second switching devices are OFF.

11. The driving device according to claim 1, further comprising:
a plurality of second switching devices, each configured to be connected to a respective load, one end connected to the reference potential node and another end connected to said respective load,
wherein the control unit turns the plurality of the second switching devices ON and OFF such that the plurality of the second switching devices are sequentially ON when the switching device is OFF.

12. The driving device according to claim 1, further comprising:
a plurality of second switching devices, each configured to be connected to a respective load, one end connected to the reference potential node and another end connected to said respective load,
wherein the control unit turns the plurality of the second switching devices ON and OFF such that the plurality of second switching devices are sequentially ON when the switching device is OFF, and wherein the control unit switches any of the plurality of the second switching devices from OFF to ON when the output voltage or the output current of the power circuit rises.

13. The driving device according to claim 1,
wherein the plurality of the loads are diodes, and
wherein the plurality of the second switching devices are turned ON in order of ascendancy of forward voltage drops of the plurality of the loads connected to the respective plurality of the second switching devices.

14. A light-emitting device, comprising:
the driving device according to claim 1, and
a light-emitting element as the load.

15. A projection device, comprising:
the light-emitting device according to claim 14.

16. A method of controlling a driving device having a power circuit that can modify an output current or an output voltage of an output terminal configured to have a load connected thereto, an output capacitor connected between the output terminal of the power circuit and a reference potential node, a switching device connected between the output terminal of the power circuit and the reference potential node, and a control unit that controls the output current or the output voltage of the power circuit, the method comprising:
controlling the switching device to be ON and OFF and controlling the output current or the output voltage of the power circuit while the switching device is ON such that a voltage of the output terminal of said power circuit while the switching device is ON becomes less than or equal to a voltage applied to the load while said switching device is OFF thereafter.

17. A driving device, comprising:
a power circuit that can modify an output current or an output voltage of an output terminal configured to have a load connected thereto;
an output capacitor connected between the output terminal of the power circuit and a reference potential node;
a switching device connected between the output terminal of the power circuit and the reference potential node; and
a control unit that controls the output current or the output voltage of the power circuit,
wherein the control unit sets the output current or the output voltage of the power circuit to a high level, a low level that is lower than this high level, and a middle level that is higher than the low level but lower than the high level, in this order in cycle repeatedly,
wherein the control unit turns the switching device OFF when the output current or the output voltage of the power circuit is set to the high level and the middle level, and
wherein the control unit turns the switching device ON when the output current or the output voltage of the power circuit is set at the low level.

18. The driving device according to claim 17,
wherein the control unit turns the switching device ON and OFF after the output current or the output voltage of the power circuit becomes the medium level,
wherein the control unit sets the output current or the output voltage of the power circuit to the low level when the switching device is ON,
wherein the control unit maintains the same output current or output voltage of the power circuit when the switching device is OFF, and
wherein the control unit stepwisely raises the output current or the output voltage of the power circuit from the middle level to the high level while the switching device is OFF.

19. The driving device according to claim 17,
wherein the control unit, after the output current or the output voltage of the power circuit has been set to the middle level, stepwisely raises the output current or the output voltage of the power circuit from the middle level to the high level while the switching device remains OFF thereafter.

* * * * *